March 29, 1966 A. DRITZ 3,243,332
APPARATUS FOR SIMULATED PLASTIC SEWING
Filed Jan. 30, 1961 5 Sheets-Sheet 1
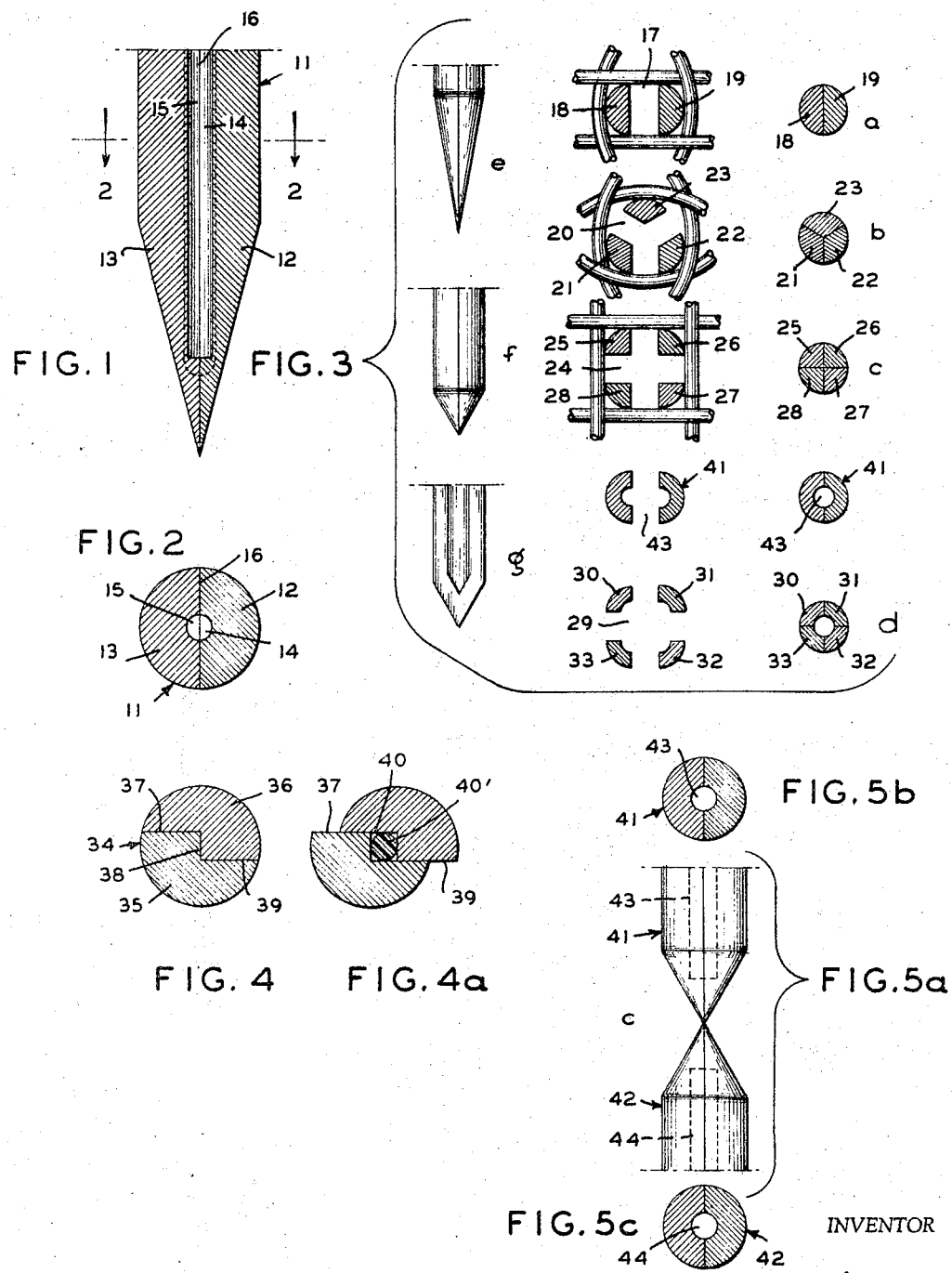
INVENTOR
Arthur Dritz
BY
Sol Shapiro
ATTORNEY March 29, 1966  A. DRITZ  3,243,332
APPARATUS FOR SIMULATED PLASTIC SEWING
Filed Jan. 30, 1961  5 Sheets-Sheet 2
FIG. 6
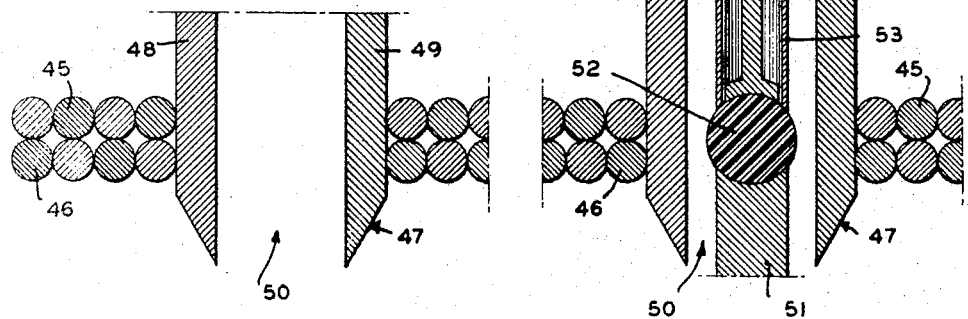
FIG. 7
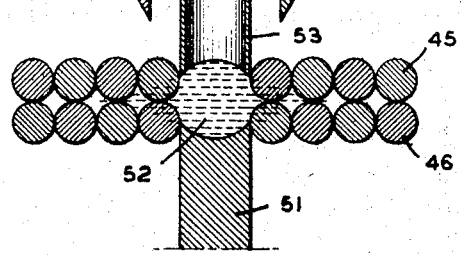
FIG. 8

INVENTOR
Arthur Dritz
BY Sol Shappirio
ATTORNEY

March 29, 1966  A. DRITZ  3,243,332
APPARATUS FOR SIMULATED PLASTIC SEWING
Filed Jan. 30, 1961  5 Sheets-Sheet 3

INVENTOR
Arthur Dritz
BY Sol Sheppiro
ATTORNEY

March 29, 1966  A. DRITZ  3,243,332
APPARATUS FOR SIMULATED PLASTIC SEWING
Filed Jan. 30, 1961  5 Sheets-Sheet 4

INVENTOR
Arthur Dritz

BY Sol Shapiro
ATTORNEY

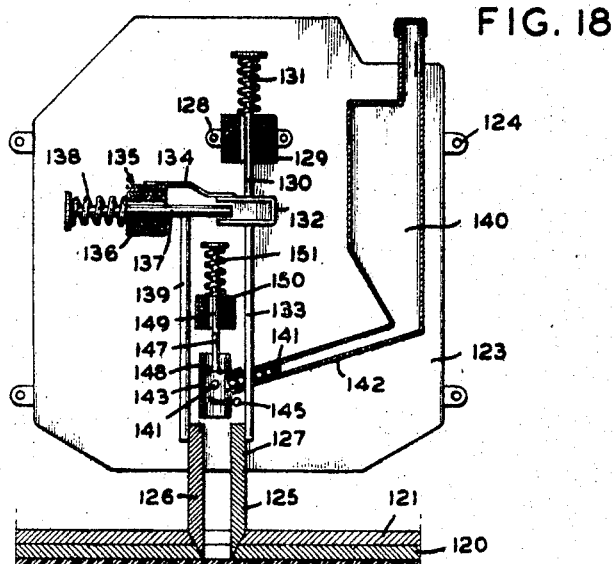

United States Patent Office 3,243,332
Patented Mar. 29, 1966

3,243,332
APPARATUS FOR SIMULATED PLASTIC SEWING
Arthur Dritz, 171 Beach 125th St., Rockaway Park,
New York, N.Y. 11694
Filed Jan. 30, 1961, Ser. No. 86,569
4 Claims. (Cl. 156—513)

This invention relates to method and apparatus for simulated plastic sewing wherein a fabric or related material is decorated or plies of fabric or related materials are decorated or bonded together, and to articles resulting from such process.

Methods have been suggested in the prior art for fastening sheets or layers of material together. But the methods and apparatus have been limited in the operations employed, and did not have flexibility for control in a variety of operations and further the resulting products frequently did not give satisfactory articles in appearance or durability.

Among the objects of the present invention are methods and apparatus for producing decorated fabrics and other sheet and layer material, or layers or plies of such sheet material or fabrics which are attached together by simulated plastic sewing or related plastic configuration that may also serve as a decorative ornamentation.

Other objects include the resulting articles.

Further objects and advantages will appear from the detailed description set forth below which is given for illustrative purposes without limitation since changes may be made by those skilled in the art within the scope and spirit of this invention.

In connection with the detailed description set forth below, the drawings illustrate the following. FIGURE 1 is a fragmentary front elevation of a needle usable in the present invention and FIGURE 2 is a section on line 2—2 of FIGURE 1. FIGURES 3a, b,c, d are similar sections to FIGURE 2 showing variations in needles. FIGURE 4 is a section like FIGURE 2 of a further needle variation with FIGURE 4a showing the needle portions separated and a pellet held in the needle. FIGURE 5a shows a further variation of juxtaposed upper and lower needles with 5b and 5c showing sections like FIGURE 2.

FIGURES 6 to 8 are schematic fragmentary vertical sectional views to illustrate successive steps in a three step operation using the invention.

Figure 9A:
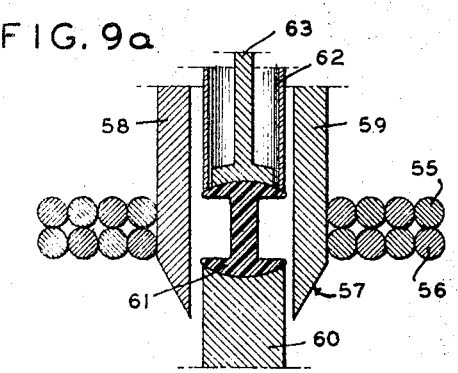
Figure 9B:
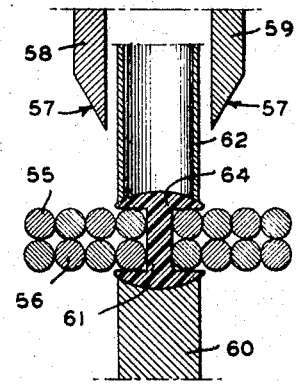
Figure 9C:
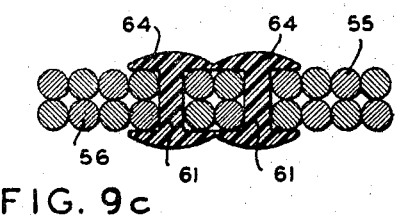
Figure 9D:
Figure 10A:
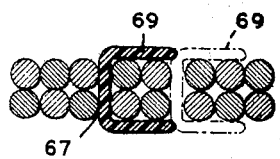
Figure 12A:
Figure 10B:
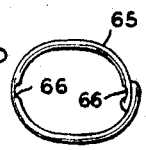
Figure 11A:
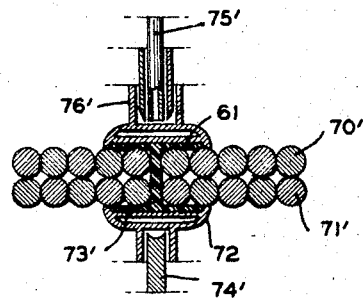

FIGURES 9 and 10 illustrate operations with variations in the form of plastic composition use. In FIGURES 9a, b and c, the plastic composition is in the form of an I or a rivet-shaped pellet. In FIGURE 10, the pellet is C-shaped. In FIGURES 11a and b, the operations are directed to control of the surface ornamentation. In FIGURE 12, the pellets are illustrated as of two different kinds. In FIGURE 13, the pellet is an encapsulated composition.

Figure 14:
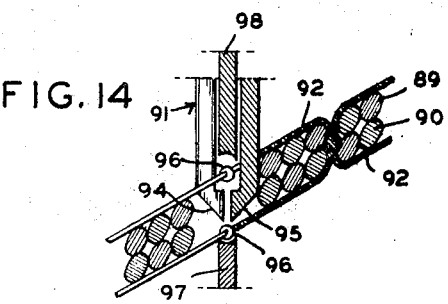
Figure 15:
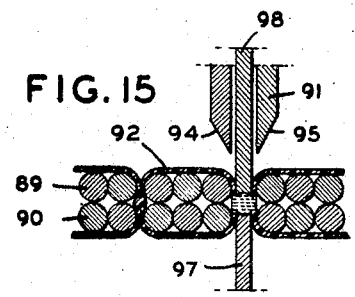
Figure 16:
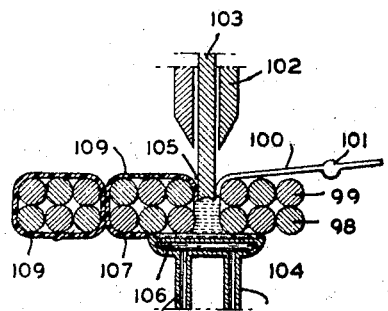
Figure 17:
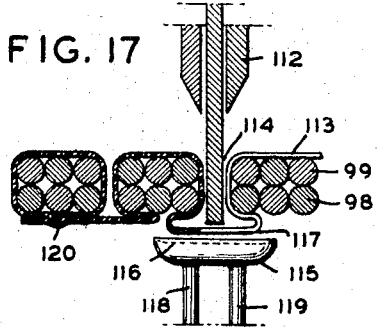

FIGURES 14 and 15 illustrate an operation where a continuous plastic thread is utilized for the bonding operation while FIGURE 16 illustrates such operation where only a top thread is employed. FIGURE 17 illustrates a method of using a single plastic thread.

Figure 23:
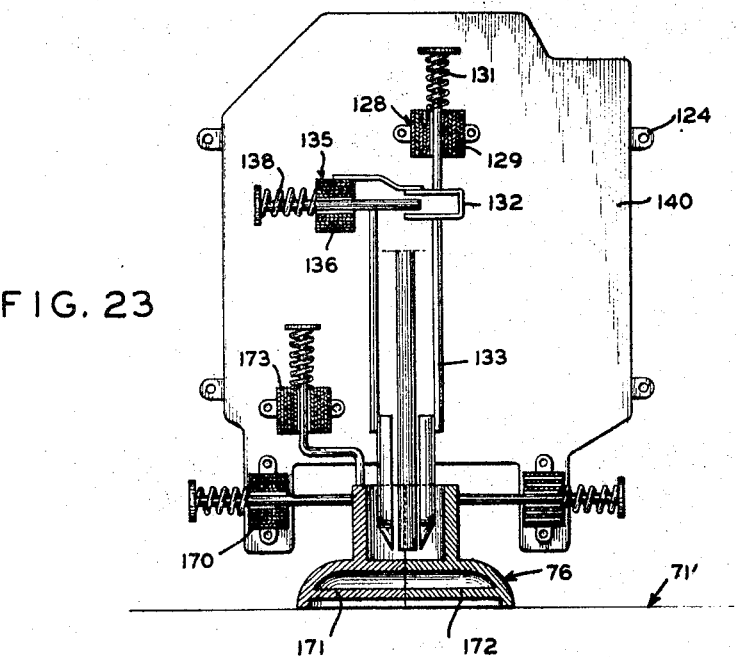

FIGURE 18 illustrates a vertical section through one form of machine usable in carrying out the present invention. FIGURES 19 to 22 are fragmentary details of operative features in connection with the machine of FIGURE 18. FIGURE 23 is a vertical section through a modified form of a portion of the machine of FIGURE 18.

In accordance with the present invention, the application of plastic composition to fabric or other plies or layers of materials of flexible or pliable character for the purposes of ornamentation or decoration or to bind such plies or layers together by plastic media particularly simulating sewing or other needle applied media, is carried out by the utilization of what may be called a split-needle or a needle having portions which are transversely separable to provide a channel between such separated portions from which delivery of a plastic composition may be controllably carried out in fluent or non-fluent condition and distributed on or within the layers or sheets of recipient material and fixed therein or thereon. The transverse movement of the needle portions may serve several purposes. In the first place it forms a channel in the sheet or layers which may penetrate entirely through the layer or layers, or not, to limit the entry into the plies or layers or to reach the intermediate surface of an inner ply or layer. Or it may be used to enlarge a channel or opening already present or it may be used to feed a plastic or other composition or pellet to a particular location on or within the layers, or on the back face thereof. Any arrangements or uses may be employed, according to the effect desired.

The term needle is used here in a generic sense and not as limited to needles commonly employed in sewing operations. They will generally be slender rods made of two or more parts by longitudinal division of the rod, the parts being capable of being moved apart from one another to form a channel between the portions or if a channel is already present, to enlarge such channel; and returned to normal portion to close such channel or reduce its size for repetitive utilization. The needles may be made of any desired material such as metal, hard plastic, etc., but metal such as iron or steel is satisfactory.

The composition or pellet delivered into the needle may vary within wide limits. In general it will be of two types: fluent or material in condition to flow and non-fluent material which may be solid or semi-solid. The solid or semi-solid material may be of any type desired as long as it may be readily converted into flowable condition for application in situ to the ply or plies or layers, and capable of setting or hardening or of being set or hardened in situ at the point of effectiveness with respect to the ply or layers. For example, where the material is fluent but is readily converted to non-fluent condition after location at the area desired, there may be plastic compositions settable by heat or containing a catalyzing or setting or hardening agent operable when heated. Or solution or dispersion in a solvent or vehicle may be used, particularly organic volatile liquid, where application of heat will produce rapid setting by evaporation of solvent or action of catalyst, latent or otherwise.

Non-fluent materials are those capable of application in solution or dispersion and utilized as given above for fluent compositions, or capable of flowing upon application of heat and then setting or solidifying upon withdrawal of heat or application of cooling. Both fluent and non-fluent compositions may be made from resins or resin mixtures, either natural and synthetic resins or mixtures; cellulose derivatives both cellulose esters such as nitrate or acetate or butyro acetate, or cellulose ethers, etc. Resinous type materials include polyethylene, nylon type resins, polyvinylidene chloride such as "saran"; polyvinyl chloride or polyvinyl acetate which will flow when heated but set at room temperature, etc. Polyvinyl chloride dissolved in acetone, latex rubber in an alcoholic or naphtha vehicle, etc. are usable. Polyester type resins such as "castolite" is typical of resins which harden by catalyst action are exemplary of the class of polyester resins which may be utilized, particularly epoxy resins, and catalysts or curing agents for them including urea formaldehyde and phenol formaldehyde resins, as well as flow control agents such as ureas, silicones, polyvinylbutyral, etc. Alkyd and other polybasic acid-polyhydric alcohol resins, urea formaldehyde resins, phenol-formaldehyde resins, etc. may all be used in fluent or non-fluent compositions.

The ply or layer or strata material to be decorated or joined together, may be of various types and character, natural or synthetic. It is particularly useful in connection with textiles or other fabrics of woven, knit or other manufacture and whether made of natural fibers such as cotton, wool, silk, etc., or of synthetic fibers such as rayon, nylon, polyethylene, "Dacron," etc., or mixtures of the natural fibers or of the synthetic fibers, or of natural and synthetic fibers. Since the invention is particularly useful with fabrics, or textiles, these will be used to illustrate the disclosure set forth below.

Referring to the drawings, FIGURES 1 to 5 illustrate different types of needles that may be employed in the present invention. In FIGURE 1, needle 11 is made of two portions, 12, 13 which are duplicates formed by dividing the needle by a vertical axial plane. Centrally, each portion carries a semi-cylindrical channel 14, 15 which form channel 16 for receipt of plastic composition in pellet form or otherwise. Provision is made in use to insert the needle into the fabric, and to separate the portions 2 and 3 of the needle to spread the fibers or other material of the ply or plies or layers being treated, to form or to enlarge a channel already present, for withdrawal of the needle portions and their return to normal, to move the needle or the fabric with respect to one another, and to repeat the action. During such series of movements, binder composition is directed within the channel of the needle, and the needle withdrawn while the binder is positioned on or in or between the ply or plies where it is fixed in position. This will be more particularly described below.

FIGURES 3a, b, c, d illustrate transverse sections through needles made of two, three and four porions, otherwise similar to the needle of FIGURES 1 and 2, except that in FIGURES 3a, 3b, and 3c there is no preformed channel, but the latter is formed only upon transverse movement of the needle portions, FIGURE 3a giving a straight channel between separated portions 18, 19; FIGURE 3b giving a Y-shaped channel 20 between trisectoral portions 21, 22, 23; FIGURE 3c giving a cruciform channel 24 between tetra-sectoral portions 25, 26, 27, 28. In FIGURE 3d, four or tetra-annular sections 30, 31, 32, 33 form annular channel 29.

In FIGURE 4 needle 34 is shown, in cross-section, made of two portions 35, 36 having step-shaped faces 37, 38, 39 adapted to fit closely together so that when moved on faces 37, 39, channel 40 is formed into which binder composition 40 such as in pellet form may be inserted.

FIGURES 5a, b and c illustrate upper and lower coacting needles 41, 42, each being similar to the needle of FIGURE 1. They coact in opposing directions to introduce binder composition from channels 43, 44.

A number of diagrammatic illustrations are given in FIGURES 6 to 12 to demonstrate specific types of operations. Binder compositions may be in the form of pellets, powder, paste, liquid, and will be illustrated here by pellets. As illustrated here, binder compositions in the form of shaped elements such as pellets may be used. In such operations, three main steps may be employed. Step one may include insertion of a needle into assembled superposed plies followed by transverse separation of the needle portions to form a channel. Step two includes positioning of the pellet of binder composition within the channel adjacent the fabric plies approximately where the binder is to be applied to the plies. In step three, the needle is retracted, the fibers of the fabric tend to and partially return to their position before channel formation, thus holding the pellet in position, and heat such as electrothermal action is developed to convert the pellet into fluent condition to cause flow or distribution of binder into the desired areas of the plies. Discontinuation of heat permits the binder to set in situ as desired.

Thus, in the operation of FIGURES 6 to 8, the assembled plies 45, 46 of FIGURE 6 have ben penetrated by needle 47, and in FIGURE 7, needle portions 48, 49 have been separated transversely while penetrating the plies, to form channel 50 within the plies to provide a path for the binder composition. In the second operation, illustrated in FIGURE 7, lower metal bar 51 moves upwardly into position and upper hollow metal tube 53 downwardly in channel 50, bar 51 forms a seat for reception of the plastic composition, upper or filler tube 53 guiding pellet 52 to position. The latter is dropped into channel 50, and plunger 54 moves downwardly to force the pellet to the desired area. Where the pellet is spherical or cylindrical or of any shape and size where it may drop readily into position on bar 51, plunger 54 need not be employed. In the third operation illustrated in FIGURE 8, needle 47 has been retracted, the fibers of the material due to their elasticity move toward the binder composition, and heat is applied to cause the composition to become fluent as by fusion. One method of heating desirably used, employs passage of current between bar 51 and filler tube 53. Radiant heat may be applied as from a heating lamp or otherwise. Flow and spread of binder within and between layers 45 and 46 followed by setting or hardening of the binder forms the bond desired. While heat fusible binders which set upon withdrawal of heat may be employed, any types of compositions may be used in operations where two stages may be controlled of fluent and non-fluent character. Resin compositions containing a time-delay catalyzer, readily available on the market may be employed, as, for example, polystyrene compositions containing a hardening catalyst the action of which may be time-controlled. Before repeating the operation, in any of these methods, the needle portions are brought together again, the needle inserted into the plies, and the cycle continued. Repetitive operations of this character may be carried out in rapid succession.

The use of initially non-fluent binder composition has been illustrated above with pellets of spherical shape. But they may take any variety of forms to obtain particular results as illustrated in FIGURES 9 and 10. Thus in FIGURES 9a to 9c, the operations follow the sequence referred to above for FIGURES 6 to 8, but in this case the pellet is given a rivet-type form. Thus FIGURE 9a shows plies of fabric 55, 56 penetrated by needle 57 with separated needle portions 58, 59, lower bar 60 supporting rivet-shaped pellet 61, directed to position by upper tube 62 and plunger 63. In FIGURE 9b, needle 57 has been retracted and in FIGURE 9c the fabric by elasticity of its fibers has moved against the side walls of the pellet. Upon completion of the operation as in FIGURE 8, the heat will fuse the binder which will penetrate the plies. The length of the rivet may be such as to extend between 2, 3, or any number of layers or plies of fabric desired. Head 64 on the rivet type pellets if placed closely enough together will fuse to form a continuous thread, the shape of which will depend on the shape of the head portion and of the conditions controlling spread. Thus, the form of such thread or of the fused areas of binder may be shaped and their spread controlled to give various surface effects or ornamentation as further explained below.

FIGURE 10 illustrates an operation where in lieu of rivet-shaped pellets, the pellets are C-shaped. The operations may be same as explained above for the rivet-shaped pellets of FIGURE 9 and more generally in FIGURES 6 to 8. With pellets of this type, a guide may be used in the upper tube to position them vertically although this is not absolutely essential. Thus, upper tube 65 may have parallel tracks 66 in which pellet 67 slides in vertical position to the lower bar such as 60 of FIGURE 9. As shown in FIGURE 10a, the fabric plies move into the side opening of pellet 67 and serve to bind the fabrics. When as shown in FIGURE 10a, the upper arms 69 of adjacent pellets touch, fusion will produce a continuous thread. This may be further directed and controlled.

Figure 11B:
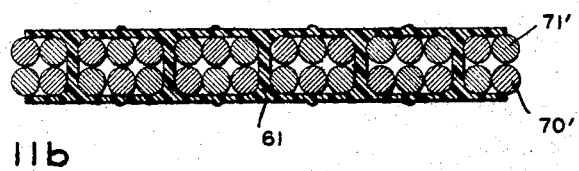

Referring now to FIGURE 11a, operations are carried out to produce surface ornamentation. For this purpose, needle and feeder tube are surrounded by a grooved (channel) head which presses down tightly on fabric or other material to form a seal within which head, plastic when heated to flowable condition, will flow within the head channels which control the configuration of the plastic. As illustrated in FIGURE 11a, plastic rivets 61 may be placed in position as shown in and described for FIGURES 9a and 9b, or pellets 77, 78 positioned as shown in and described for FIGURE 12b, between fabric layers 70' and 71', FIGURE 11a, where the rivets or pellets, as the case may be, are held between the fabrics after the needle is withdrawn as explained for other figures. Lower head 72' having channel 73' is raised into position by lower bar 74' while upper tube 75' carrying upper head 76' is lowered into position to press the channel heads firmly against the fabric plies. Heat is then applied by electrical heating elements or sun lamps or otherwise to fuse the plastic. The latter then flows in the channels, top and bottom, to form any desired surface configuration depending on the channel design, while intermediate the layers, the plastic flows to bond the layers together. Upon removal of the heat, the plastic solidifies. The operation may be repeated to form a series of interconnecting units as shown in FIG. 11b with plastic welds joined together to form continuity. The heads restrict the movement of plastic as no adhesive material or plastic may spread or extend beyond the area designated.

In any of the operations referred to herein, particularly when pellets such as spherical or cylindrical shapes are employed, may be carried out with pellets of two or more different colors or compositions, and the different compositions thus used may complement or modify each other in any desired way. As shown in FIGURE 12a, different fragments 74 and 75 may be bonded as at 76 and used as single pellet entities in any of the operations set forth herein. Thus, one fragment may contain a catalyst or setting agent for a resinous composition in the other fragment so that when the pellet is positioned and heated to become fluent, the two fragments will mix in situ, flow to position, and set.

Figure 12B:
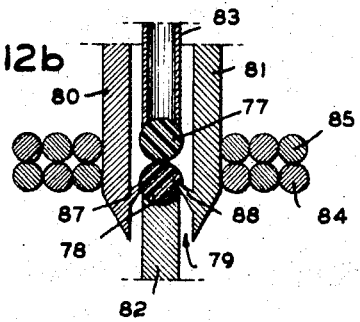
Figure 13:

As shown in FIGURE 12b, differently constituted pellets 77, 78 may be used without constituting fragments of a single pellet entity. Thus, pellets 77, 78 may be positioned in channel 79 formed between needle portions 80, 81 by lower bar 82 and upper tube 83 within fabric plies 84, 85. The sequence of operations is the same as in the operations set forth above, except that in this case, the differently constituted pellets are fed in pairs or sets of the different units, either successively or together. There may be any number of pellets depending on the number of plies.

Where it is desired to use fluent compositions, while these can be metered to the upper (filler) tubes 53, 62, 83, in lieu of pellets, the pelleting type of operation is so convenient and simple, that fluent compositions may be encapsulated and the capsules used in any of the operations set forth above as pellets, or as pairs or mixtures of capsules or pellets of different composition, color, function all as explained above. While pressure of bar 82 may be used to crush and open the capsules to release the fluent binder or other composition, more positive release can be obtained by providing piercing pins 87, 88 on needle portions 80, 81 so that when the latter are retracted, they pierce capsules 87, 88 to release the fluent binder composition or differently composed compositions which mix and depose in situ for setting or hardening. Two or more component compositions, such as catalyst and non-catalyst components or setting and settable components are expeditiously utilized in this way.

Encapsulated compositions of any desired type may be employed where the composition is of binder type, and encapsulation thus enables even liquid solutions to be used in any degree of viscosity so long as they serve for binders. They may be in the form of liquids of any degree of viscosity, emulsions, colloidal solutions, pastes, powders, colored or dyed, etc. A number of encapsulated compositions are purchasable on the market and may be utilized, so long as they will serve as binders for the ply material. Any of the binder compositions herein set forth may be used in encapsulated form. Solutions formed in volatile solvents may be used, which upon pressure or puncture of capsule, release the solvent for evaporation and setting of the composition in situ.

As exemplary of encapsulated materials, the following is noted. The binder composition, for example, in liquid form may be converted into microscopic particulate size and each particle or droplet coated as with a thin layer of gelatin. The droplets or particles may vary in size depending on the manner of utilization. They may be as small in size as a millionth of an inch or they may be much larger into macroscopic size. The coated fine particles may be tiny capsules, but all are dry to the touch, though they may consist of say 50 to 70% liquid, for example, in 50 to 30% coating. The droplets depending on the coating used, protect the liquid or other encapsulated material, or function where two or more reactive components are to be kept separated until some specific time. Any material used in the art for making capsules, may be employed here but chosen with respect to encapsulated composition to avoid undesired reactivity.

Instead of using pellets or capsules fed successively or otherwise into the filler tube, it is feasible to use a chain or continuous string or thread, desirably of plastic, carrying spaced pellets or encapsulated components of binder composition, the needle directing a pellet or capsule into a channel when the operations for distributing the binder and setting it in situ, may be carried out as set forth above. Thus, in FIGURE 14, plies 89, 90 assembled in superposed position are penetrated by needle 91 to form a channel. As the needle comes down over thread 92, needle portions are open to pass over pellet 96 the needle portions 94, 95 serving to center pellet or capsule 96, while lower thread 92 is positioned below in a groove in the table top with a pellet vertically alined with that in the upper thread. The operations may proceed as explained above. The needle portions are separated and retracted, while lower bar 97 moves upwardly through an opening in table top or other support used, to force the lower pellet into position within the plies of fabric, and substantially simultaneously upper bar 98, moves downwardly to direct the upper pellet into position between the plies of fabric. The pellets may be brought together or left apart. The binder composition may be operated on by heat, or electrically, or electronically to flow and set it; and the thread, if fusible plastic, may also be fused if temperatures are chosen for that purpose. In this way also it is possible to simulate stitching if desired. The resulting article is seen in section in FIGURE 15. In any operation where pellets or capsules are inserted into the channel both from top and bottom, each pellet may be positioned between different plies such as where three plies are used. Multiple pile layers may be bonded in this way.

A single string carrying spaced pellets or capsules may be used and bottom simulated stitching formed as well as on top. As shown in FIGURE 16, plies of fabric 98, 99 are superposed and operations carried out as in FIGURES 14 and 15, with only one string 100 of pellets 101. Needle 102 and upper bar 103 function as in FIGURE 15 or FIGURE 17. However, head 104 at first below fabric 99 is placed beneath channel 105, and has depression 106 so that fluent binder composition will pass down channel 105 into depression 106 to form lower thread 107 on each side of channel 105. Inlet 110 and outlet 111 may deliver a fluid heated into hollow header 104 or a cooling fluid depending on the phase of the operation first to cause flow and second to assist in setting. A repetition of the operation will serve to bond the plies over any desired length of plies as well as to simulate stitching on the outer faces 108, 109 of the plies.

As shown in FIGURE 17, operations similar to that described for FIGURE 16 may be carried out with a continuous thread without any pellets to simulate stitching on both top and bottom faces. For this purpose, superposed plies 110, 111 after retraction of needle 112, have a plastic thread or ribbon 113 drawn over channel 114 and forced through in sufficient amount so that temperature control head 115 having depression 116 will receive lower loop 117 in fluent condition and force it against lower adjacent portions of fabric. Temperature control fluid may be circulated through hollow head 115 by inlet and outlet connections 118, 119, or an electric heating element may be operated in heater head 114 through conventional electrical connectors (not shown) with plastic composition from ribbon 113 which sets rapidly in depression 116. If the doubled over lower loop is of sufficient width to cover the distance between successive channels, the tips of successive loops will meet to form a continuous ribbon with accentuated nubs 120 to simulate stitching or for other ornamental or decorative purposes. In this operation as in all others, repetitive operations as described above may be carried out over extensive areas.

The articles produced in accordance with the present invention are unique in structure and possess characteristics that are important in their use. Since the binding of the plies or layers is desirably obtained by starting from deposition of the binder between the plies, and spread of the binder within the plies, the bulk of bonding material is positioned to give a localized, strong internal bond; and in addition, no surface deposit is essential, but where the latter is used the only material deposited on the surfaces of the fabric layers is controlled and directed as predetermined for ornamentation or decorative effect.

Structure and electrical controls that may be utilized to obtain the sequence of operations are illustrated in FIGURES 18 to 22. Layers 120, 121 of fabric to be joined together are shown superposed, upon release sheet 122 such as of silicone rubber sheeting. Above layers 120, 121, housing 123 for the mechanism is placed as by wall brackets 124. Within housing 123, needle 125 consisting of transversely movable needle portions 126, 127 is mounted for vertical reciprocation. For this purpose solenoid 128 is mounted in the upper portion of the housing, solenoid coil 129, controlling plunger 130 which is spring-biased by spring 131 into normal position with the needle retracted from the fabric layers. Plunger 130 carries dash pot housing 132 from which suspension rod 133 supports needle portion 127. Dash pot housing 132 held by bracket 134, carries solenoid 135 which controls transverse separation of needle portions 126, 127. Coil 136 of solenoid 135 operates plunger 137 which moves within dash pot housing 132 and is normally spring-biased by spring 138 so that suspension rod 139 attached to plunger 137 at one end and to needle portion 126 at the other normally positions needle portion 126 transversely separated from needle 127. It will be seen that the transverse separation of needle portions 126, 127 is relative, since portion 126 moves to and from portion 127, while the latter remains laterally substantially stationary. When upper needle 125 is used without lower support bar 152, the needle at its lowest point may impinge against release sheet 122 to which it does not adhere. When lower bar 152 is used, an opening 122' in sheet 122 permits conjoint action of bar 152 and needle 125.

Binder composition in pellet or capsule form may be readily introduced as follows. Storage hopper 140 feeds pellets 141 into chute 142 which delivers to upper tube 143 where the pellet next to be fed, is balanced on fulcrum 144 by weighted end 145 about pivot 146. Upper arm 147 having head 148 which contacts pellet 141, is moved downwardly by plunger 149 connected thereto, under activation of solenoid 150 but normally is spring-biased by spring 151 out of contact with the pellet.

When lower support bar 152 is used, this is mounted below fabrics 120, 121 on wall plate 153, bar 152 acting as a plunger actuated by solenoid 154 having coil 155, the plunger being spring-biased by spring 156 normally with bar 152 in non-supporting position. Activation of solenoid 154 elevates bar 152.

Control of operations is desirably maintained by a rotary switch which may be operated manually or preferably automatically in timed rotation. Switch 157 has contact strips 158, 159, 160, 161, one for each of the solenoids 128, 135, 150, 154, with appropriate electrical connections 163–167 so that rotation of switch arm successively activates the solenoids in the necessary timed relations. The position of the contact strips is adjustable for timing control.

Insofar as the rotary switch is concerned, there may be any number of such contact strips, and solenoids with appropriate electrical connections so that rotation of the switch arm activates solenoids in the necessary timed relations. Some arrangements and operating structures will require more than others. For example in FIGURE 11a, the raising of lower bar 74 and lowering of upper tube 75 will require switch control. This may be effected in exactly the same way as for filler tube 53 and lower bar 51 in FIGURE 7 except that an additional control structure on the switch set-up will be necessary for upper tube 75 and desirably operation of lower bar 74 is simultaneously coordinated with that of tube 75. This is explained in FIGURE 23 below.

Let us assume that the switch arm moves clockwise. If first contacts contact strip 158. Conductor 163 activates solenoid 135 to close the needle. Contact strip 159 is then reached to close the circuit through conductor 164 and to operate solenoid 128 to lower the needle. When switch arm 162 reaches gap 158' in contact strip 158, needle portions 126, 127 separate while the needle is still within the fabric and thus enlarge the channel within the fabric. At this time, contact strip 160 is engaged, which through conductor 165 closes the circuits simultaneously to activate solenoids 147a and 155. Solenoid 147a then actuates upper arm 147 to push pellet 141 down into needle 125 at a level between the plies of fabric while lower support bar is moved upwardly to receive pellet 141 and hold it in position at the same time, the contact with strip 164 is broken so that the needle is retracted under action of spring 131. This retraction usually takes place after the pellet is softened. The contact arm moves on to contact strip 161 and closes the circuit through conductor 166 connected to the heating element whether needle portions, heating lamp, heating coil, or otherwise. The heat fuses the sealing material which then diffuses upon and within the fabric or other layers depending on the operation being carried out. At this time the switch arm has passed all contacts so that all remaining elements not already in initial position are restored to such position and the machine is ready for repetitious use. Analogous operations may be carried out for the operations in any of the devices shown as in FIGURES 6 to 17.

The needle may not be completely retracted but left for the time in contact with the upper portion of the pellet. When gap 158' ends, further contact with the contact strip energizes he circuit to move needle portions 126, 127 toward each other into contact with the pellet or pellets. In this way the circuit may be completed through the pellets to cause heating and fusion. Or in any of the figures the upper tube and lower bar or upper and lower bars may be used as electrodes, the circuit being completed through the pellet.

FIGURE 23 supplements FIGURE 18 to supply additional operations such as are described above in connection with FIGURES 11a and b. This provides mechanism for positioning head 76. Additional contact strips are supplied together with added electrical connections of exactly the same type as already described but here are used to accomplish the functions supplied by the mechanism of FIGURE 23 which will be part of the machine of FIGURE 18. When the needle has been elevated by solenoid 128 prior to the heating operation, solenoid 170 is operated to move split head portions 171, 172 together, if split head portions are used. Solenoid 173 is then energized to move upper head 76 downwardly rigidly against fabric layer 71'. At this time the heating operation will be carried out as explained for FIGURE 18. The head pressure will mold the fused material and direct it into desired position and upon discontinuance of heat, the fused material will solidify in place.

While the above operation is described where only the upper head is used, it may be duplicated for operation simultaneously of a lower head as referred to in connection with FIGURE 11. Just as a supplemental set-up may be used in FIGURE 18 to conduct additional operations therein as explained in connection with the sealing heads, so, too, supplementary circuits may be included in FIGURE 18 for any purposes desired.

Having thus set forth my invention, I claim:

1. Apparatus for securing plies of fabric together, which includes means to assemble superposed plies of fabric, means to insert a needle into said plies of fabric the needle having portions transversely movable with respect to one another to form a channel between the portions within the fabric, means to separate the needle portions to form such channel within the plies, means to introduce binder matter into the channel adjacent the position of the plies, means to retract the needle portions from the plies leaving the binder matter within the plies to bind them together adjacent the areas of application of the binder matter, in which the binder composition is non-fluent when introduced, the apparatus includes means to convert the binder composition into fluent condition to contact the fabric, and means to convert the fluent composition into non-fluent after retraction of the needle.

2. Apparatus of claim 1 in which the binder matter is introduced as a pellet in substantially non-fluent condition, means to cause the binder matter to flow after removal of the needle, and means for setting the binder matter to non-fluent condition to bind the plies together, the apparatus also including means for repetitious insertion of the needle, the material of the plies being stretched at each insertion to form the channel, means to insert a pellet at each insertion of the needle, the pellet being C-shaped in cross section, and means for retracting the needle after each insertion to permit the plies to move into side openings of the C-shaped pellets.

3. Apparatus of claim 2 including means to join the contiguous ends of the C's to form a continuous thread.

4. Apparatus as set forth in claim 1, means to compress the fabric about the fluent composition to effect a seal while limiting the flow of fluent composition, and means for setting the composition.

References Cited by the Examiner

UNITED STATES PATENTS

| 500,556 | 7/1893 | Blanchard | 112—222 |
|---|---|---|---|
| 1,560,712 | 11/1925 | Naylor | 154—43 |
| 1,857,949 | 5/1932 | Freydberg. | |
| 1,958,455 | 5/1934 | Ware | 154—116.5 |
| 2,140,672 | 12/1938 | Gray | 154—116.5 |
| 2,175,633 | 10/1939 | McDermott | 223—102 |
| 2,189,067 | 2/1940 | Hlavaty. | |
| 2,341,019 | 2/1944 | Cook. | |
| 2,353,960 | 7/1944 | King. | |
| 2,366,274 | 1/1945 | Luth. | |
| 2,422,065 | 6/1947 | Anselmi | 29—235 |
| 2,458,152 | 1/1949 | Eakins. | |
| 2,465,374 | 3/1949 | Haman. | |
| 2,470,963 | 5/1949 | Wegl. | |
| 2,523,932 | 9/1950 | Abbott | 223—102 |
| 2,557,668 | 6/1951 | Lincoln | 154—42 |
| 2,785,643 | 3/1957 | Mitchell | 122—222 |
| 2,824,595 | 2/1958 | Lehre. | |
| 2,890,481 | 6/1959 | Leahy et al. | 156—580 |
| 3,122,465 | 2/1964 | Keller et al. | 156—93 |

FOREIGN PATENTS

| 1,136,398 | 12/1956 | France | 154—42 |
|---|---|---|---|
| 232,635 | 6/1944 | Switzerland | 156—580 |

EARL M. BERGERT, *Primary Examiner.*

C. T. KRAFFT, D. J. DRUMMOND,
*Assistant Examiners.*